United States Patent Office 3,817,932
Patented June 18, 1974

3,817,932
TWO-STEP PROCESS FOR PRODUCING
WATER-SOLUBLE ALKYD RESINS
Kenneth H. Albers, Alden E. Blood, and Thomas C. Snapp, Jr., Longview, Tex., assignors to Eastman Kodak Company, Rochester, N.Y.
No Drawing. Application June 10, 1971, Ser. No. 151,952, now Patent No. 3,709,858, dated Jan. 9, 1973, which is a continuation-in-part of application Ser. No. 41,577, May 28, 1970, now Patent No. 3,652,501, dated Mar. 28, 1972. Divided and this application July 11, 1972, Ser. No. 270,760
The portion of the term of the patent subsequent to Mar. 28, 1989, has been disclaimed
Int. Cl. C08g 20/30
U.S. Cl. 260—75 N                    7 Claims

ABSTRACT OF THE DISCLOSURE

Water-soluble alkyd resins having low Gardner color are prepared by a plural-step process in which a polycarboxylic acid having 4 to 20 carbon atoms is reacted at a temperature of from about 110° C. to 260° C. with a polyhydric aliphatic or cycloaliphatic alcohol having 2 to 10 carbon atoms to give a reaction product having an acid number of between about 50 to 250. The reaction product is then cooled to about 80°–180° C. and blended with a trioletheramide compound having the formula:

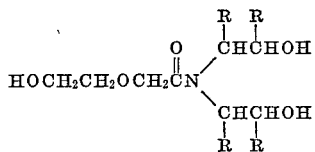

wherein each R is hydrogen, methyl or ethyl. The blend is then reacted at a temperature of about 110° C. to 260° C. for a sufficient time to give an alkyd resin having an acid number of between about 30 to 100 and a low Gardner color.

---

This application is a divisional of copending U.S. Patent Application Ser. No. 151,952, filed June 10, 1971, now U.S. Pat. 3,709,858, issued Jan. 9, 1973, which in turn is a continuation-in-part of U.S. Pat. Application Ser. No. 41,577, filed May 28, 1970, now U.S. Pat. 3,652,501, issued Mar. 28, 1972.

This invention relates to novel alkyd resins that contain the trioletheramides, N,N-bis[2-hydroxyalkyl]-2-hydroxyethoxyacetamide. More particularly, the invention is concerned with the preparation of curable, water-soluble polyesteramides of the aforementioned trioletheramide, a polyhydric aliphatic or cycloaliphatic alcohol and a polycarboxylic acid(s) or anhydride(s) useful in the preparation of protective coating compositions having improved impact-resistance and hardness. The term "water-soluble" as used in the specification and claims means that the alkyd resins are soluble in a mixture of water and, if necessary, from about 1 to about 50 weight percent (preferably from about 25 to about 40 weight percent) of an organic coupler or co-solvent. Preferably, this coupler is an alcohol or glycol although other organic or inorganic solvent agents may be used.

Alkyd resins comprising residues of polyhydroxy compounds, such as glycerine, trimethylolpropane, and pentaerythritol and polycarboxylic acids in the polymeric chain have heretofore been utilized to provide surface coating compositions such as paint; see U.S. Pat. No. 3,213,063. Other alkyd resins such as certain polyesteramides are also known from the prior art as exemplified by U.S. Pat. Nos. 3,447,916; 2,644,773; 2,831,813; 2,944,025; 3,341,573; 3,083,188; French Pat. No. 1,542,811; Canadian Pat. No. 812,738; Belgian Pat. No. 732,008 and Japanese Pat. No. 16,911/69. Many of these polyesteramides, however, are oil-soluble materials and are used as additives for petroleum products. Certain of these various types of alkyd resins do not provide satisfactory protective coating compositions unless subjected to a separate hot air dry curing operation. Moreover, many of these alkyd resins when used in protective coating compositions require the use of expensive polycarboxylic acid compounds if the resultant alkyd resin used in the protective coating composition is to be water-soluble. In addition, protective coating compositions prepared from certain of these prior art alkyd resins are less impact-resistant and less hard than is desired in many cases.

None of the prior art alkyd resins, such as those noted above, contain the residue of the trioletheramides, N,N-bis[2 - hydroxyalkyl] - 2 - hydroxyethoxyacetamide. These particular trioletheramides have unexpectedly been found to possess a high degree of water solubility. A description of these novel trioletheramides may be found in copending U.S. Patent Application Ser. No. 41,576, filed May 28, 1970, which is hereby incorporated in the present application by reference thereto.

It is an object of the present invention to provide a polyesteramide having the residue of the aforementioned trioletheramides in the polymeric chain.

Another object of the invention is to provide polyesteramides capable of being used as protective coating compositions for metallic and other types of substrates.

A further object of the invention is to provide water-soluble, curable polyesteramides capable of being utilized in a protective coating composition which, when coated onto metallic substrates and baked, cure to form protective surface coatings exhibiting improved hardness and impact resistance in addition to other desirable properties such as solvent and weather resistance, flexibility and gloss.

It is a further object of the present invention to provide improved water-soluble protective coating compositions which possess such useful properties.

It is still another object of the present invention to provide new water-soluble, curable polyesteramide resins capable of being used in protective coating compositions.

Another object of the present invention is to provide polyesteramide resins suitable for use in protective coating compositions which are curable without a separate hot air drying operation prior to baking the protective coating compositions on a substrate.

These and other objects of the present invention will become apparent from the following description.

According to the present invention there is provided a curable, water-soluble polyesteramide of (A) a polycarboxylic acid component, and (B) a polyhydric alcohol component, the alcohol component comprising a substantial amount of a compound having the formula:

(I)
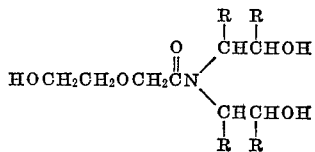

wherein each R is a member selected from the group consisting of hydrogen, methyl and ethyl, with the proviso that the ratio of hydroxyl groups in the alcohol component to carboxyl groups in the acid component is within the range of about 1.0:1 to about 1.6:1, preferably 1.2:1 to 1.4:1, and that the components through an oxycarbonyl linkage form integral recurring ester units of the polyesteramide molecular chain. If the ratio of hydroxyl groups to carboxyl groups is less than 1:1, an undesirable tacky film is formed rather than a resin while if the ratio exceeds 1.6:1 it becomes extremely difficult to build a resin having the desired molecular weight. The term "polycarboxylic acid component" is meant to include both aliphatic and aromatic polycarboxylic acid and anhydride compounds (or mixtures thereof) having 4 to 20 carbon atoms. The polyhydric alcohol component comprises, in addition to the trioletheramide compound of Formula I shown hereinabove, a polyhydric aliphatic and/or cycloaliphatic alcohol having 2 to 10 carbon atoms such as, for example, neopentyl glycol or 1,4-cyclohexanedimethanol. The percent of the trioletheramide to aliphatic and/or cycloaliphatic alcohol in the polyhydric alcohol component may vary within the range of from about 25 to about 70 weight percent of the total amount of the alcohol component.

In a further aspect of the present invention there is provided a water-soluble protective coating composition comprising in admixture about 1 to about 70 weight percent, and preferably about 10 to about 50 weight percent, of the above-described polyesteramides, a neutralization compound, water, and if necessary or desirable, from about 1 to about 50 weight percent (and preferably from about 25 to about 40 weight percent) of an organic or inorganic coupler or co-solvent such as, for example, an alcohol or glycol which promotes the solubility of the alkyd resin in water.

In another aspect of the invention there is provided a process for preparing the above described polyesteramides which comprises heating a mixture of the above-described polycarboxylic acid component and polyhydric alcohol component within a temperature range of from about 110° C. to about 260° C. until a polyesteramide reaction product having an acid number between about 30 to about 100 is obtained. Preferably, the mixture is heated in the presence of an azeotropic medium, e.g., toluene, to remove the water of reaction. In addition, a polyester catalyst such as lead oxide, zinc acetate, antimony oxide and the like may be utilized in amounts of about 0.05 to about 5.0 weight percent based on the weight of said reaction mixture excluding the azeotropic media if used. However, it is preferred to carry out this process without a catalyst.

The novel polyesteramides of the present invention are of a particular value because they can be converted to a crosslinked, insoluble form, as for example in a baked protective coating composition, without the use of a separate curing operation, such as air drying, before baking the protective coating composition. Moreover, inasmuch as the water-solubility of the present polyesteramide resins is aided by the water-solubility of the novel trioletheramide, it is unnecesary to use the more expensive polycarboxylic acid compounds such as dimethylolpropionic acid, trimellitic anhydride or 5-sodium-sulfoisophthalic acid presently used in producing conventional water-soluble alkyd resins. The prior art teaches that conventional water-soluble alkyd resins prepared from such polyhydric alcohols as glycerine, dimethylolpropionic acid, trimethylolethane, trimethylolpropane and pentaerythritol generally require tri- and tetracarboxylic acids such as trimellitic acid and anhydride, and benzophenone tetracarboxylic acid, etc., to obtain solubility. Accordingly, these alkyd resins are made water-soluble by neutralization of the unreactive carboxyls in the tri- and tetracarboxylic acid components of the resins. Moreover, these conventional water-soluble alkyd resins also utilize the tri- and tetracarboxylic acid to provide crosslinking of the alkyd resin. In contrast, crosslinking of the polyesteramide of the present invention is provided by the recurring units of N,N-bis[2-hydroxyalkyl - 2 - hydroxyethoxyacetamide residue appearing in the polymeric molecular chain. Hence, less expensive polycarboxylic acid components such as adipic acid and phthalic acids may be utilized and, in fact, are preferred. Water solubility of the resins and resin systems of the present invention is also obtained upon neutralization over a pH range of 6–9.

The novel polyesteramide resins of the present invention may vary in properties depending upon the particular amount and types of materials comprised by the polyhydric alcohol component and the polycarboxylic acid component. For example, the water-solubility of the polyesteramide may vary depending upon the amount of the trioletheramide residue contained in the polymeric molecular chain. In addition, other properties of the alkyd resin such as glossiness, hardness and impact-resistance will vary to some extent depending upon the additional types of polyhydric alcohol compounds utilized as part of the alcohol component. For example, neopentyl glycol and 1,4-cyclohexanedimethanol provided an alkyd resin with excellent gloss, hardness and impact-resistance. In general, however, the acid number of the polyesteramide product is wtithin the range of from about 30 to about 100.

The polycarboxylic acid or acids comprising the polycarboxylic acid component of the instant polyesteramide resin may be selected from those acids or anhydrides having from about 4 to about 20 carbon atoms and selected from the group consisting of aliphatic (by aliphatic is meant alkyl and alkenyl) and aromatic acids and anhydrides having at least 2 carboxyl groups. Preferably, the polycarboxylic acid is a dicarboxylic acid or anhydride having from 4 to about 12 carbon atoms. Examples of these preferred acids include diglycolic, maleic, succinic, glutaric, adipic, suberic, sebacic, phthalic, isophthalic, terephthalic, mixtures of the foregoing compounds and the like. Examples of the preferred anhydrides include anhydrides of diglycolic, maleic, succinic, glutaric and phthalic acid and mixtures of these compounds. Tri- and tetrafunctional carboxylic acid compounds such as trimellitic anhydride, benzophenone tetracarboxylic acid, dimethylolpropionic acid, etc. may also be used; however, as pointed out above, these tri- and tetrafunctional acids are more expensive and unnecessary, hence not preferred. Especially suitable polycarboxylic acids are isophthalic and adipic acid, as well as phthalic anhydride and mixtures of the same.

The polyhydric alcohols or polyols as they are often called which may be used in the polyhydric alcohol component of the polyesteramide of the present invention to complement the novel trioletheramide described hereinabove, are aliphatic glycols, including cycloaliphatic glycols, containing at least 2 carbon atoms, preferably up to 10 carbon atoms. Suitable straight chain aliphatic glycols include polymethylene glycols such as, ethylene, propylene, dipropylene, tripropylene, hexamethylene, diethylene, triethylene, butylene, heptylene, neopentyl, hydroxypivalyl hydroxypivalate, etc. Glycols containing 1 or 2 secondary hydroxyl groups can also be used such as 1,2-propylene glycol; 2,3-hexanediol; 2,3 - butanediol; 2,2,4-trimethylpentane-1,3-diol and the like. Among the cycloaliphatic glycols that may be used are cycloalkane glycols such as 1,2-cyclohexanedimethanol; 1,2 - dihydroxy cyclohexane; 1,3-cyclohexanedimethanol; 1,4 - cyclohexanedimethanol; and the like. Preferred glycols are the alkyl and cycloalkyl glycols. Especially useful glycols are propylene glycol, neopentyl glycol and 1,4-cyclohexanedimethanol. Use of mixtures of any two or more of these glycols is also contemplated by the present invention. Advantageously, the amount of polyhydric aliphatic or cycloaliphatic alcohol contained in the polyhydric alcohol component of the poly polyesteramide in addition to the trioletheramide described above, varies from about 30 to about 75 weight percent of the total amount of the polyhydric alcohol component.

Preparation of the polyesteramides of the invention can be affected by condensing the polyhydric alcohol component and the polycarboxylic acid component by, for example, the fusion cook or the solvent cook technique using an azeotropic solvent such as, for example, toluene, to remove the water of reaction. All reactants may be mixed together and heated in a single stage reaction although when certain reactants such as, for example, isophthalic acid, is one of the major reactants a hazy or cloudy resin may be produced. To avoid the production of such a hazy or cloudy resin, the reaction must be carried out in two stages. Although catalysts such as those noted hereinabove may be utilized, it is preferred that the reaction be carried out without catalyst. It has been discovered that this particular reaction is preferably continued until the polyesteramide reaction product has an acid number of from between about 30 to about 100 which generally means reaction time will vary from about 1 to about 12 hours or longer. In addition, it has been discovered that the temperature for carrying out this particular reaction process varies from about 110° C. to about 260° C. The preferred reaction temperature is within the range of about 120° C. to about 200° C.

The polyesteramide resin prepared as described above can be stripped of solvent, if any is used. Having thus obtained the resin in a viscous liquid form, the protective surface coating composition of the present invention may then be prepared as follows: the polyesteramide resin and an aqueous medium containing a neutralization compound (or volatile base as it is sometimes called) such as, for example, ammonia or preferably N,N-dimethylethanolamine are mixed together. The polyesteramide may be in a liquid form when admixed with the basic aqueous medium preferably at a temperature within the range of 60° C. to 80° C. The basic aqueous medium dissolves the polyesteramide resin and neutralizes free acid groups of the resin. As a result, there is obtained a clear resin solution with a pH generally from about 6 to about 9, although resin solutions with slightly lower pH's may also be obtained. If necessary or desirable, some of the water in the aqueous media in which the polyesteramide is dissolved may be replaced with from about 1 to about 50 weight percent (preferably from about 25 to about 40 weight percent) of an organic coupler or co-solvent for the alkyd resin. Preferably this coupler is an alcohol such as ethanol, tertiary or normal butanol, an ether alcohol or an ether alcohol ester such as the monobutyl ether of ethylene glycol or the like, since the polyesteramide of the present invention is alcohol-soluble as well as water-soluble. This clear resin solution provides an excellent surface composition for metallic and other substrates. In addition to modifying the aqueous medium of the surface coating composition by partial substitution of alcohols as noted above, the surface coating composition may also be modified by the addition of certain pigments such as, for example, TiO₂ and the resulting mixtures may be used as an enamel paint for metal substrates. Advantageously, a surface coating composition according to the present invention contains about 1 to 70 weight percent polyesteramide, about 1 to 50 weight percent of a coupling solvent, about 20 to 70 weight percent water and about 1 to 4 weight percent of a neutralization compound. Preferably, the coating composition contains about 40 weight percent polyesteramide, 15 weight percent coupling solvent, 42 weight percent water with the remainder being a neutralization compound.

The polyesteramide protective coating composition of the present invention may be coated on a variety of substrates as by brushing, dipping, spraying, stirring or impregnating. The coating composition, when applied on the substrate, is baked at temperatures between 125° C. and 180° C., thereby curing by loss of the neutralization compound and condensation of free carboxyl and hydroxyl groups. The resulting baked coating is glossy, flexible, solvent and weather resistant, and possesses improved impact-resistance and hardness. The coating composition is especially advantageous over known water-soluble coating compositions in that there is no need for any special curing operation such as air drying prior to baking. In addition, the baking temperature noted above, i.e., 125° C. to 180° C., is no higher than, and in many instances substantially less than, the temperature required to bake conventional alkyd enamels. Moreover, when baked and cured, the surface coating composition of the present invention yields coatings which are harder and more impact-resistant than most other conventional coatings as will be demonstrated hereinafter. Baking time for the coating composition of the invention varies from about 10 minutes to about 40 minutes. Although longer times may be used, some cratering and yellowing of the coating may occur when these longer baking times are used.

The following examples are included to further illustrate the present invention. In these examples, the term trioletheramide refers to the compound N,N-bis[2-hydroxyethyl]-2-hydroxyethoxyacetamide.

EXAMPLE 1

This example demonstrates the typical one-stage reaction process used to produce the water-soluble polyesteramide of the present invention. A 1-liter, 4-neck, round-bottom flask is fitted with mechanical stirrer, a thermometer, a nitrogen gas dispersion tube, and a Dean-Stark trap which in turn is fitted on a steam-jacketed condenser beneath a water-cooled condenser. The flask is charged with 100 milliliters toluene, 107.9 grams of isophthalic acid, 51.1 grams of adipic acid, 86.6 grams of neopentyl glycol, and 64.6 grams of the trioletheramide, N,N-bis-[2-hydroxyethyl] - 2 - hydroxyethoxyacetamide. The mixture is heated to 140° C. and maintained at this level for about 5 hours. During this time removal of the water of reaction occurs. The resulting product is a highly viscous homogeneous liquid having an acid number of 58. This liquid is the polyesteramide of the present invention and has a Gardner color of 4 (see ASTM D 1544). Having obtained the polyesteramide resin, the resin is then dissolved in a solution of 2-dimethylaminoethanol in aqueous t-butyl alcohol to give an aqueous-alcoholic solution of the polyesteramide having a pH of from 7 to about 9. This solution contains 40% by weight of the polyesteramide resin. A curing agent of hexamethoxymethylmelamine, although not necessary, is added to the resin solution in an amount of 15 weight percent based on the weight of the polyesteramide resin contained in the solution. The polyesteramide solution is then pigmented with TiO₂ at a pigment to resin ratio of 0.7:1. The resulting mixture is milled for about 16 hours. A film of this resulting mixture is applied at a thickness of about 0.0015 inch to a steel plate and then baked without preliminary drying at about 150° C. for about 30 minutes. The baked enamel coating exhibits good gloss, does not soften when a few drops of acetone is placed on the film, and does not crack when the coated steel plate is given a 180° bend on a ¼-inch conical mandrel. In an impact hardness test, the baked steel plate coating is not damaged by an impact of 90 inch pounds. In addition, the baked coating exhibits a pencil hardness greater than 6H.

EXAMPLE 2

This example demonstrates the polyesteramide of the present invention containing 1,4-cyclohexanedimethanol as an additional aliphatic polyhydric alcohol compound complementing the trioletheramide rather than the neopentyl glycol used in Example 1. The reaction apparatus used in this apparatus is identical to that described above in Example 1. In this example, the flask is charged with 100 milliliters of toluene, 51.1 grams of adipic acid, 108.0 grams of isophthalic acid, 121.8 grams of 1,4-cyclohexanedimethanol and 58.4 grams of the trioletheramide, N,N-bis[2-hydroxyethyl]-2-hydroxyethoxyacetamide. The mixture is heated to 135° C. and then during a 10-hour interval is slowly raised to 155° C. During this time the water of reaction is removed. The resulting polyesteramide product is a highly viscous homogeneous liquid having an acid number of 62, and a Gardner color of 4. This alkyd resin of polyesteramide is then dissolved in an aqueous alcoholic solution of ethanol and water. The solution contains 50 percent by weight ethanol. The solution also contains ammonium hydroxide as the volatile base or neutralization compound used to neutralize free acid groups contained in the polyesteramide resin. The resulting resin solution contains 40 percent by weight polyesteramide and has a pH of 7 to 9. Hexamethoxymethylmelamine is added as a curing agent in an amount of 12.5 weight percent based on the weight of the alkyd resin content. A coating composition of enamel which contains a $TiO_2$ pigment is then prepared according to the procedure described above in Example 1. A 0.001 inch film of this enamel coating composition mixture is painted on a steel plate and is baked without preliminary drying at about 160° C. for about 30 minutes. The baked coating has a good gloss, does not soften when a few drops of acetone are placed on the coating, and does not crack when the steel plate test panel s given a 180° bend on a ⅛-inch conical mandrel. The pencil hardness of the coating is greater than 6H, and it is not damaged by an impact of 150 inch pounds.

This example shows that other alcohols in addition to t-butanol noted in Example 1 above may be used as a co-solvent for the polyesteramide resin which is being processed into a protective surface composition. In addition it shows that other bases in addition to the 2-dimethylaminoethanol used in Example 1 above may be used to neutralize the free acid contained in the polyesteramide which is dissolved in the aqueous-alcoholic media.

EXAMPLE 3

This example demonstrates that propylene glycol, phthalic acid and succinic acid can be utilized to produce a satisfactory resin in accordance with the present inventon. It also shows that film can be produced without the addition of an external cross-linking agent such as hexamethoxymethylmelamine used in Examples 1 and 2.

In this example, the reaction apparatus and procedure used to prepare the polyesteramide resin is identical to that described above in Example 1. Here, 64.3 grams of propylene glycol, 58.4 grams of the trioletheramide, 108.0 grams of phthalic acid, and 41.3 grams of succinic acid are charged to the reaction flask. The flask is heated to a temperature of 132° C. for a time of about 10 hours. The resultant polyesteramide resin product has an acid number of 86 and a Gardner color of 4. A coating composition prepared from this polyesteramide in a manner identical to that described in Example 1 above passes the acetone test described in Example 1, has a pencil hardness of 6H and an impact resistance of 20 inch pounds.

EXAMPLE 4

This example demonstrates that 2,2,4-trimethylpentan-1,3-diol and phthalic anhydride can be utilized to produce a satisfactory polyesteramide resin in accordance with the present invention. In this example, a polyesteramide resin is again prepared as described by the procedure set out in Example 1 above. 58.4 grams of the trioletheramide, 96.2 grams of phthalic anhydride, 51.1 grams of adipic acid, and 123.5 grams of 2,2,4-trimethyl-pentan-1,3-diol are charged to the reaction flask. The flask is heated to a temperature of about 160° C. for a time of about 22 hours. The acid number of the resultant polyesteramide resin obtained therefrom is 46 and a Gardner color of 4. An enamel prepared by the procedure of Example 1 is made from this polyesteramide resin. The enamel is applied as a film of 0.001 inch thick on a steel plate and without preliminary drying is baked at about 150° C. for about 30 minutes. This baked film passes the acetone test described in Example 1 and has excellent gloss. The pencil hardness and impact resistance of the film is 6H and 20 inch pounds, respectively.

EXAMPLE 5

This example demonstrates that ethylene glycol, maleic anhydride and adipic acid without an aromatic dicarboxylic acid can be utilized to produce the satisfactory polyesteramide resin according to the present invention. It also demonstrates that a large excess of hydroxyl groups in comparison to carboxyl groups may be used without deleterious effect.

In this example, there is approximately a 45 percent excess of hydroxy groups. This resin is prepared by the procedure and in the reaction apparatus described in Example 1. In this example, 69.1 grams of ethylene glycol, 131.4 grams of adipic acid, 9.8 grams of maleic anhydride and 46.2 grams of the trioletheramide are charged to the reaction flask. The flask is heated to a temperature of about 120° C. for a time of about 7 hours. The resultant polyesteramide resin obtained which has an acid number of 85 and a Gardner color of 4, is diluted with water to form a 40 percent non-volatile in water solution. An enamel surface coating composition is prepared from this polyesteramide resin using the procedure described in Example 1 hereinabove. A film of this enamel is applied to a steel plate and without preliminary drying is baked at about 350° F. for about 30 minutes. The baked film passes the acetone test described in Example 1, has a pencil hardness of 3H, and has an impact resistance of 20 inch pounds.

EXAMPLE 6

This example demonstrates that terephthalic acid and diethylene glycol can be utilized to produce a satisfactory polyesteramide resin according to the present invention. In this example, excess hydroxyl content of the initial reactant is lowered so that there is only about a 10 percent excess of hydroxyl groups over the amount of carboxyl groups.

This resin is prepared according to the procedure and in the reaction apparatus described in Example 1 above. In this example, 54.9 grams of diethylene glycol, 80.3 grams of trioletheramide, 83.0 grams of terephthalic acid and 73.0 grams of adipic acid are charged to the reaction flask. The flask is heated to about 125° C. for a time of about 6 hours. The resultant polyesteramide resin obtained, which has a Gardner color of 4, is then converted into a protective coating composition enamel by the procedure described in Example 1. A thin 0.0015 inch film of this enamel is applied on a steel plate and without preliminary drying is baked at about 300° F. for about 30 minutes. The baked film exhibits good gloss, passes the acetone test described in Example 1, and does not crack when the test panel of steel plate is given a 180° bend on a ⅛-inch conical mandrel. The pencil hardness of the baked film is greater than 6H, and it is not damaged by an impact of 140 inch pounds.

EXAMPLE 7

In this example, hydroxypivalyl hydroxypivalate is utilized as one of the polyhydric alcohol components of the polyesteramide resin of the present invention. The resin in this example is prepared by the procedure and in the reaction apparatus described in Example 1. In this case, 58.4 grams of the trioletheramide, 172.5 grams of hydroxypivalyl hydroxypivalate, 83.0 grams of isophthalic acid and 73.0 grams of adipic acid are charged to the reaction flask.

The flask is heated to about 150° C. for a time of 6 hours. The resultant polyesteramide resin has an acid number of 67 and a Gardner color of 4. An enamel prepared from this polyesteramide resin by the procedure described in Example 1 is painted at a thickness of 0.001 inch on a steel plate and without preliminary drying is baked at about 350° F. for about 30 minutes. The baked film has a good gloss, passes the acetone test described in Example 1, and does not crack when the test panel is given a 180° bend on a ⅛-inch conical mandrel. The pencil hardness of this film is 4H, and it is not damaged by an impact of greater than about 160 inch pounds.

EXAMPLE 8

This example demonstrates that at the conditions specified hereinbelow the substitution of glycerine for the trioletheramide used in the present invention produces a water-insoluble alkyd, rather than a water-soluble alkyl resin. In this case, 26.0 grams of glycerine, 88.0 grams of neopentyl glycol, 108.0 grams of isophthalic acid, and 51.1 grams of adipic acid are charged to the reaction flask according to the procedure described in Example 1. The flask is heated to a temperature varying from 125° C. to 180° C. over a period of 28 hours. The resulting alkyd resin product has an acid number of 97. This alkyd resin product and ammonium hydroxide are added to 400 milliliters of a water-ethanol solution containing 50 percent by weight water until a pH of 8 to 10 is reached. The alkyd resin remains insoluble and forms a sludge in the aqueous ethanol solution. An amount of hexamethoxymethylmelamine equal to 12.5 weight percent of the alkyd resin content is added to the aqueous-ethanol mixture. The alkyd resin still remains an insoluble sludge. An attempt is made to prepare the alkyd resin-containing mixture into an enamel using the procedure described in Example 1. However, the resulting composition cannot be satisfactorily painted on a steel test panel.

Results similar to those described in Example 8 are obtained when pentaerythritol is substituted for the trioletheramide used in the alkyd resin of the present invention. That is, the resultant alkyd is water-insoluble and a satisfactory enamel cannot be prepared by using the procedure described in Example 1.

As mentioned hereinabove, in certain instances such as when isophtalic acid or phthalic anhydride is one of the reactant components, it is necessary that the reaction be carried out in two stages if a resin with a lower Gardner color is desired. In the first stage of the reaction, the polycarboxylic acid or anhydride, or a mixture thereof, of the polycarboxylic component is blended with the polyhydric aliphatic or cycloaliphatic alcohol of the polyhydric alcohol component. The blend is heated to a temperature of between about 110° C. and about 260° C., and preferably between 120° C. and 200° C. for a period of from about 0.5 to about 8 hours, preferably from 1 to 3 hours. It is critical that the acid number of this first-stage reaction be maintained between about 50 and about 250, and preferably between 150 and 250, if isophthalic acid is one of the reactant components. If the acid number of the first stage is lower than about 50, a hazy resin will be produced from isophthalic acid whereas an acid number of greater than about 250 will result in a higher Gardner color in the finished resin.

The resulting product from the first reaction stage is cooled to a temperature of between about 80° C. and about 180° C. The trioletheramide portion of the polyhydric alcohol component, along with any additional polycarboxylic acid or anhydride, or mixture thereof, of the polycarboxylic acid component which is to be added is then blended into the first stage product. The resulting mixture is then heated to a temperature of between 110° C. and 260° C., preferably 120° C. to 200° C., for a period of between 1 and 12 hours, preferably between 1 and 3 hours.

The final acid number of the finished alkyd resin is critical and must be between about 30 and 100, preferably between 40 and 70.

Although catalysts such as those noted hereinabove may be utilized, it is preferred that the reaction be carried out without catalyst.

The following examples illustrate the two-stage reaction process:

EXAMPLE 9

A one-liter, four-neck, round-bottom flask is fitted with a mechanical stirrer, nitrogen gas purge, thermometer, and Dean-Stark trap which is fitted on a steam-jacketed condenser beneath a water-cooled condenser. The flask is charged with 249.1 grams of isophthalic acid and 220.0 grams of neopentyl glycol. The mixture is heated with stirring to 205° C. and maintained at this level for about one hour. During this time 20 grams of water of reaction evolves. The resulting product, having an acid number of 214, is cooled to 150° C. A charge of 146 grams of the trioletheramide, N,N-bis[2-hydroxyethyl]-2-hydroxyethoxyacetamide, and 146 grams of adipic acid are charged to the flask. The resulting mixture is heated to 160° C. and held at this temperature for about two and one-half hours. During this time, an additional 57 grams of water of reaction is collected. The resulting product is a highly viscous homogeneous liquid having an acid number of 46, a hydroxyl number of 118 and a number-average molecular weight of 1045 (determined by ebulliometry). The polyester resin is cooled to 80° C. and thinned to 70% nonvolatile with 290 grams of the monobutylether of ethylene glycol. The solution has a Gardner color of 2 and a Gardner viscosity of Z–1 (see ASTM T–1545). The resin solution (140 grams) is dissolved in a solution of 7.1 grams of N,N-dimethylethanolamine in 75 grams of distilled water to give a solution of the polyesteramide having a pH of 6.4. The solution is added to 83 grams of titanium dioxide (Du Pont R–960) and milled for 16 hours in a ball mill. A curing agent of 10 grams of hexamethoxymethylmelamine is then added and the mixture is milled an additional two hours. The resulting enamel has a Ford number 4-cup viscosity of 96 sec. (see ASTM D–1200). A film of the enamel is sprayed at a thickness of about 0.0012 inch on a steel plate and then baked without preliminary drying at about 150° C. for about 30 minutes. The baked enamel coating exhibits good gloss, does not soften when a few drops of acetone is placed on the film, and does not crack when the coated steel plate is given a 180° bend on a ¼-inch conical mandrel. In an impact test, the baked enamel is not cracked by an impact forward or reverse of 160 inch pounds. In addition, the baked coating exhibits a pencil hardness greater than 4H.

EXAMPLES 10–24

The process of Example 9 is repeated except that the temperature, acid number, etc., are varied as indicated in Table I. Examples 10 through 18 illustrate the production of isophthalic acid, water-soluble alkyd resins in which 1.5 moles of isophthalic acid is reacted with 1.0 mole adipic acid, 0.71 mole N,N - bis[2 - hydroxyethyl] - 2 - hydroxyethoxacetamide and 2.12 moles of a polyhydric alcohol. In Examples 10 through 17 the polyhydric alcohol is neopentyl glycol while in Example 18 the polyhydric alcohol is 2,2,4-trimethylpentane-1,3-diol. Examples 19 through 24 illustrate the production of phthalic anhydride, water-soluble alkyd resins in which 1.5 moles of phthalic anhydride is reacted with 1.0 mole adipic acid, 0.65 mole, N,N-bis[2-hydroxyethyl]-2-hydroxyethoxyacetamide and 1.95 moles of a polyhydric alcohol. In Examples 19 through 21 the polyhydric alcohol is neopentyl glycol; in Example 22 it is diethylene glycol; and in Example 23 it is propylene glycol. Example 23 is run as Examples 10–17 except that the polyhydric alcohol is diethylene glycol and the diacid is 2.5 moles of adipic acid.

TABLE I

| Ex. | First stage, °C. | Second stage, °C. | Mid[1] acid No. | Final acid No. | OH No. | Mol wt. | Viscosity[2] | Gardner color[3] | Total reaction time, hours |
|---|---|---|---|---|---|---|---|---|---|
| 10 | 229 | 163 | 89 | 49 | 133 | 739 | Y | +1 | 2.5 |
| 11 | 210 | 166 | 251 | 57 | 146 | 777 | X | 2 | 3.5 |
| 12 | 230 | 164 | 100 | 45 | 132 | 838 | Y | +1 | 3.5 |
| 13 | 215 | 160 | 190 | 57 | 139 | 834 | X | +1 | 3.0 |
| 14 | 195 | 160 | 230 | 63 | 104 | 1,045 | Z-3 | +5 | 7.5 |
| 15 | 214 | 160 | 214 | 46 | 118 | 1,045 | Z-1 | 2 | 3.5 |
| 16 | 214 | 160 | 219 | 52 | 130 | 998 | Z | +1 | 3.5 |
| 17 | 210 | 160 | 210 | 43 | 106 | 1,257 | >Z-6 | +1 | 5.0 |
| 18 | 205 | 160 | 71 | 63 | 129 | 768 | >Z-6 | 3 | 9.5 |
| 19 | 230 | 162 | 72 | 46 | 105 | 1,390 | Y | 2 | 2.5 |
| 20 | 160 | 160 | 180 | 51 | 110 | 1,105 | Y | 5 | 5.0 |
| 21 | 185 | 160 | 81 | 42 | 129 | 1,046 | Y | 6 | 5.5 |
| 22 | 215 | 160 | 98 | 52 | 99 | 1,019 | Z | 6 | 4.0 |
| 23 | 185 | 160 | 69 | 55 | 141 | 947 | V | +6 | 3.5 |
| 24 | 215 | 160 | 120 | 35 | 98 | 1,201 | Z-2 | 2 | 3.3 |

[1] Acid number at end of first stage.
[2] 70 percent nonvolatile in monobutyl ether of ethylene glycol.
[3] (ASTM D 1544) 70 percent nonvolatile in monobutyl ether of ethylene glycol.

The invention has been described in detail with particular reference to preferred embodiments thereof, but it will be understood that variations and modifications can be effected within the spirit and scope of the invention as described hereinabove.

We claim:

1. A process for preparing a curable, water-soluble polyesteramide which comprises:
   (1) heating within a temperature range of from about 110° C. to about 260° C. for a time sufficient to obtain a reaction product having an acid number within the range of about 50 to about 250 a mixture of
      (a) an acid component containing isophthalic acid or phthalic anhydride and at least one aliphatic polycarboxylic acid having 4 to 20 carbon atoms and
      (b) a polyhydric aliphatic or cycloaliphatic alcohol having 2 to 10 carbon atoms;
   (2) cooling said reaction product to a temperature between about 80° C. and about 180° C. and blending therein a trioletheramide compound having the formula

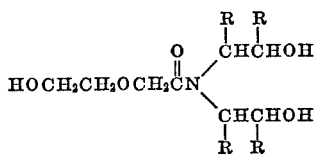

wherein each R is a member selected from the group consisting of hydrogen, methyl and ethyl; and
   (3) heating the blend of trioletheramide and reaction product to a temperature of between about 110° C. and about 260° C. for a time sufficient to obtain the polyesteramide having an acid number within the range of about 30 to about 100, the ratio of the hydroxy groups in said trioletheramide and said polyhydric aliphatic or cycloaliphatic alcohol to carboxyl groups in said polycarboxylic acid component being within the range of about 1.0 to about 1.6.

2. A process according to Claim 1 wherein the aliphatic polycarboxylic acid has 4 to 12 carbon atoms.

3. A process according to Claim 2 wherein said alcohol having 2 to 10 carbon atoms is selected from the group consisting of ethylene glycol, propylene glycol, dipropylene glycol, tripropylene glycol, hexamethylene glycol, diethylene glycol, triethylene glycol, butylene glycol, hexylene glycol, neopentyl glycol, 1,4-cyclohexanedimethanol, hydroxypivalyl hydroxypivalate and 2,2,4-trimethylpentane-1,3-diol.

4. A process according to Claim 3 wherein said alcohol is selected from the group consisting of 1,4-cyclohexanedimethanol, propylene glycol and neopentyl glycol.

5. A process according to Claim 2 wherein said aliphatic polycarboxylic acid is selected from the group consisting of diglycolic acid, maleic acid, succinic acid, glutaric acid, adipic acid, suberic acid, and sebacic aid.

6. A process according to Claim 5 wherein said acid component is isophthalic acid and adipic acid.

7. A process according to Claim 2 wherein said acid component is phthalic anhydride and adipic acid.

References Cited

UNITED STATES PATENTS 3,652,501    3/1972    Albers et al.    260—75
3,686,360    8/1972    Cunningham    260—850

MELVIN GOLDSTEIN, Primary Examiner

U.S. Cl. X.R.

117—132 B; 260—29.2 N, 75 M